US012625012B2

(12) United States Patent
Tomioka et al.

(10) Patent No.: US 12,625,012 B2
(45) Date of Patent: May 12, 2026

(54) TEMPERATURE SENSOR DEVICE

(71) Applicant: ABLIC Inc., Nagano (JP)

(72) Inventors: Tsutomu Tomioka, Nagano (JP);
Tadakatsu Kuroda, Nagano (JP);
Makoto Mitani, Nagano (JP); Naohiro Hiraoka, Nagano (JP)

(73) Assignee: ABLIC Inc., Nagano (JP)

( * ) Notice: Subject to any disclaimer, the term of this patent is extended or adjusted under 35 U.S.C. 154(b) by 346 days.

(21) Appl. No.: 18/497,996

(22) Filed: Oct. 30, 2023

(65) Prior Publication Data

US 2024/0255357 A1    Aug. 1, 2024

(30) Foreign Application Priority Data

Jan. 31, 2023    (JP) ................................. 2023-012491

(51) Int. Cl.
*G01K 7/01*        (2006.01)
(52) U.S. Cl.
CPC ..................................... *G01K 7/01* (2013.01)

(58) Field of Classification Search
CPC ........................................................ G01K 7/01
USPC ......................................................... 327/512
See application file for complete search history.

(56) References Cited

U.S. PATENT DOCUMENTS 3,812,717 A     5/1974  Miller et al.
4,331,888 A  *  5/1982  Yamauchi ................ G01K 7/01
                                                       327/512

* cited by examiner

*Primary Examiner* — Tomi Skibinski
(74) *Attorney, Agent, or Firm* — JCIPRNET

(57) ABSTRACT

A temperature sensor device is capable of measuring minute temperature changes while being manufactured at low cost without needing a high performance IC tester. A temperature sensor device includes a temperature sensor circuit 2 and a temperature sensor 1. The temperature sensor 1 includes a PN junction element 15 which is a temperature sensing element, a variable current source which supplies different forward currents of at least two values to the PN junction element 15 and a constant voltage source 16 which outputs a constant voltage having the same temperature properties as a forward voltage of the PN junction element 15.

4 Claims, 5 Drawing Sheets

100

200

100

500

I2    I1

52

51

TEMPERATURE SENSOR DEVICE

CROSS-REFERENCE TO RELATED APPLICATION

This application claims the priority benefits of Japanese application no. 2023-012491, filed on Jan. 31, 2023. The entirety of the above-mentioned patent application is hereby incorporated by reference herein and made a part of this specification.

BACKGROUND

Technical Field

The present invention relates to a temperature sensor device.

Description of Related Art

Temperature sensors used in various applications have to measure minute temperature changes. For example, the temperature detection accuracy may need to be higher than 1° C.

FIG. 5 is a circuit diagram illustrating a conventional temperature sensor 500. The temperature sensor 500 obtains a temperature from a difference in a forward voltage when forward currents I1 and I2 of different current values are passed through a diode 51, which is a temperature sensing element (see, for example, Patent Literature 1 (U.S. Pat. No. 3,812,717)).

A voltage difference $\Delta$Vo (Vo1-Vo2) output from the temperature sensor 500 is represented by A(KT/q)ln(N). Here, Vo1 is a voltage obtained by amplifying the forward voltage when the forward current I1 is passed through the diode 51 by an amplifier 52; Vo2 is a voltage obtained by amplifying the forward voltage when the forward current I2 is passed through the diode 51 by the amplifier 52; k is the Boltzmann constant; t is an absolute temperature, q is an electronic charge; A is an amplification factor of the amplifier; N is the forward current ratio I1/I2; and In is the logarithm with Napier's number e as the base, that is, the natural logarithm.

A temperature T is expressed as $q\Delta Vo/\{kAln(N)\}$, and a temperature coefficient $d\Delta Vo/dT$ is expressed as $d\Delta Vo/dT=A(k/q)\times ln(N)$.

$k=1.38\times10^{-23}$[J/K], $q=1.60\times10^{-19}$[C], and when N=2, the temperature coefficient $d\Delta Vo/dT$ is about to be $A\times60$[$\mu$V/K].

A conventional temperature sensor such as the temperature sensor 500 may measure a temperature with high accuracy because a difference in forward voltages of a diode is directly proportional to an absolute temperature.

However, a general IC tester used for a shipping inspection has resolution of 1° C. or more for an applied temperature. Thus, in the case of manufacturing a temperature sensor which measures minute temperature changes, a high performance IC tester which applies a temperature with high resolution is critical in the inspection process. A high performance IC tester is more expensive than a general IC tester, so manufacturing costs of a high performance IC tester are higher than manufacturing costs of a general IC tester.

In addition, in the case of measuring a minute temperature change, for example, a temperature change of 0.1K, the temperature coefficient $d\Delta Vo/dT$ is $A\times6$[$\mu$V/0.1K]. At this time, in order to obtain a voltage change (temperature coefficient of 600 $\mu$V/0.1K) measurable by a general voltmeter such as an IC tester, an amplification factor A of an amplifier has to be set to 100 or more. On the other hand, in the case of forward voltages Vf1 and Vf2 of a diode being about 0.6V at a certain temperature, the output voltage of the amplifier with the amplification factor A of 100 or more is 60V or more. That is, in order to measure the voltage output by the amplifier, a high voltage needs to be measured with high accuracy.

Thus, the conventional temperature sensor needs a high performance voltmeter in the IC tester used in the inspection process, resulting in high manufacturing costs.

As means for solving the problem, it is conceivable that the output voltage of the conventional temperature sensor is digitally processed and output.

However, since the conventional temperature sensor obtains the temperature from forward voltages of different two values to increase the accuracy, a resistor for storing temperature data needed for digitization becomes large. A large resistor increases a product cost.

The present invention is intended to provide a temperature sensor device capable of measuring minute temperature changes while being manufactured without using a high performance IC tester.

SUMMARY

A temperature sensor device according to an aspect of the present invention includes a temperature sensor circuit and a temperature sensor. The temperature sensor includes a PN junction element which is a temperature sensing element, a variable current source which supplies different forward currents of at least two values to the PN junction element and a constant voltage source which outputs a constant voltage having the same temperature properties as a forward voltage of the PN junction element.

The present invention may provide a temperature sensor device which is capable of measuring minute temperature changes while being manufactured without using a high performance IC tester.

DESCRIPTION OF THE EMBODIMENTS

A temperature sensor device according to an embodiment of the present invention will be described below with reference to the drawings.

Figure 1:
FIG. 1 is a block diagram illustrating a temperature sensor device of the present invention.
Figure 1:
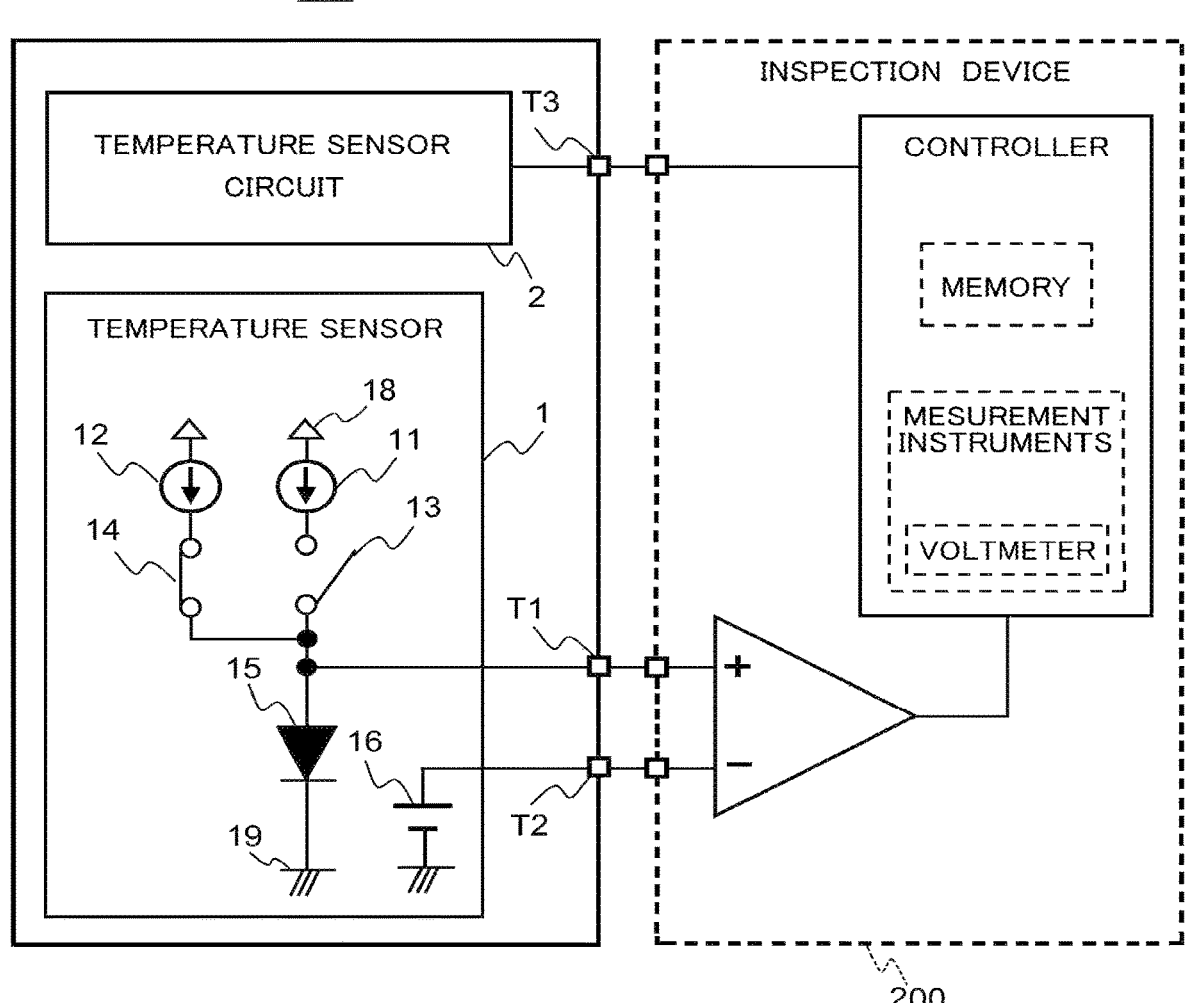

FIG. 1 is a block diagram illustrating a temperature sensor device 100 as the temperature sensor device according to the embodiment.

The temperature sensor device 100 includes a temperature sensor 1 for inspection, a temperature sensor circuit 2 and terminals T1 to T3. A temperature sensor as a product of the temperature sensor device 100 is included in temperature sensor circuit 2. The temperature sensor circuit 2 has an output port connected to the terminal T3.

The temperature sensor 1 includes constant current sources 11 and 12, switches 13 and 14, a diode 15 configured to be a temperature sensing element and a constant voltage source 16. The constant current sources 11 and 12 and the switches 13 and 14 are configured to constitute a variable current source 10.

The constant current source 11 has one end connected to a power supply terminal 18 and the other end connected to one end of the switch 13. The constant current source 12 has one end connected to a power supply terminal 18 and the other end connected to one end of the switch 14. The diode 15 has an anode connected to the other end of the switch 13, the other end of the switch 14 and the terminal T1, and a cathode connected to a ground terminal 19. The constant voltage source 16 has one end connected to the terminal T2 and the other end connected to the ground terminal 19.

The constant current source 11 outputs a constant current I1. The constant current source 12 outputs a constant current I2 having a current value different from a current value of the constant current I1. The diode 15 generates a forward voltage Vf1 in response to the supply of the constant current I1, and generates a forward voltage Vf2 in response to the supply of the constant current I2 and outputs the forward voltage Vf1 and the forward voltage Vf2 to the terminal T1.

The constant voltage source 16 outputs a constant voltage Vb having the same temperature properties as a forward voltage Vf of the diode 15 to the terminal T2. The constant voltage source 16 is configured, for example, to output a forward voltage generated in the case where a constant current slightly smaller than constant currents I1 and I2 is passed through a diode of the same type as the diode 15 as the constant voltage Vb. The constant voltage Vb is, for example, a value slightly lower than the forward voltages Vf1 and Vf2.

An inspection device 200 is configured to be a general IC tester and has a controller and an amplifier. The controller includes a memory and measurement instruments capable of measuring physical quantities, such as a voltmeter. The amplifier has, for example, a non-inverting input port connected to the anode of the diode 15 through the terminal T1, an output port of the constant voltage source 16 is connected to an inverting input port through the terminal T2 and the output port is connected to the controller.

Here, the constant voltage Vb is set to a value which may be measured by a voltmeter of a general IC tester in the case where the difference between the forward voltages Vf1 and Vf2 of the diode 15 is amplified by an amplifier. That is, the constant voltage Vb is set in consideration of the forward voltages Vf1 and Vf2 of the diode 15, an amplification factor of the amplifier of the inspection device 200, capability of the voltmeter of the inspection device 200, and the like.

The temperature sensor device 100 configured as described above is a temperature sensor as a product based on the temperature data output from the temperature sensor 1 capable of measuring a temperature with high accuracy, that is, the accuracy of the temperature sensor circuit 2 may be inspected.

Furthermore, since the amplifier of the inspection device 200 amplifies the difference between the forward voltage Vf1 output by the temperature sensor 1 and the constant voltage Vb, and the difference between the forward voltage Vf2 and the constant voltage Vb, the amplification factor may be small. Thus, the voltmeter of the inspection device

200 merely needs to measure a small voltage with high accuracy, and does not need to have high performance.

Operation of the temperature sensor 1 will be described. First, the switch 13 is turned on, the switch 14 is turned off and the constant current I1 of the constant current source 11 is supplied to the diode 15. In the case where the constant current I1 flows through the diode 15 as a forward current, the forward voltage generated in the diode 15 is assumed to be Vf1. The forward voltage Vf1 corresponds to the temperature in the case where the constant current I1 flows through the diode 15.

Next, the switch 13 is turned off, the switch 14 is turned on and the constant current I2 of the constant current source 12 is supplied to the diode 15. In the case where the constant current I2 flows through the diode 15 as a forward current, the forward voltage generated in the diode 15 is assumed to be Vf2. The forward voltage Vf2 corresponds to the temperature in the case where the constant current I2 flows through the diode 15.

The forward voltages Vf1 and Vf2 generated in the diode 15 are output to the terminal T1 and input to the non-inverting input port of the amplifier of the inspection device 200. The voltage Vb output from the constant voltage source 16 is output to the terminal T2 and input to the inverting input port of the amplifier of the inspection apparatus 200. The amplifier amplifies the difference between the forward voltage Vf1 and the voltage Vb with an amplification factor A, amplifies the difference between the forward voltage Vf2 and the voltage Vb with the amplification factor A and outputs the amplified differences to the controller.

Figure 2:
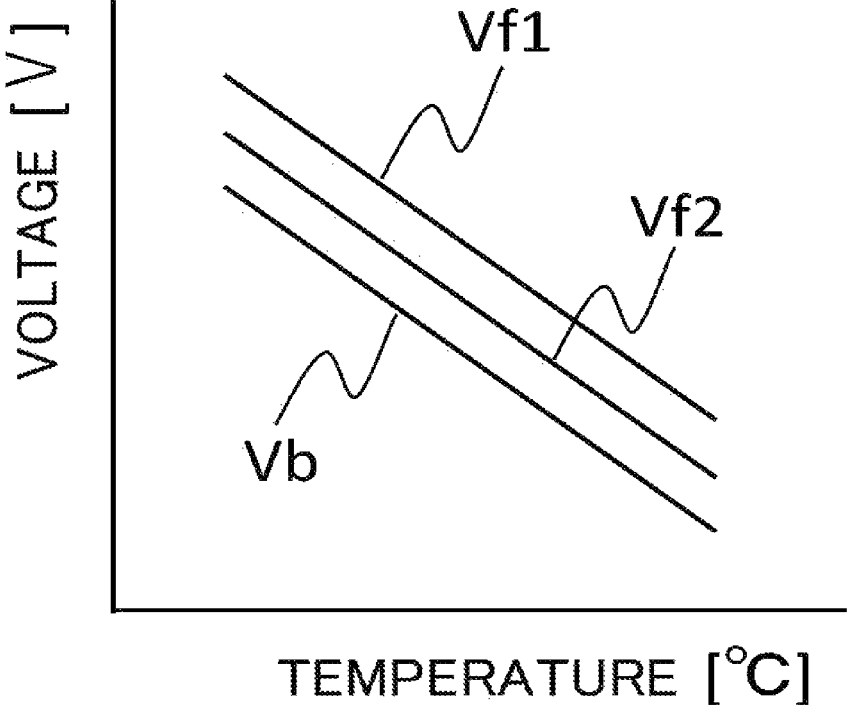
FIG. 2 is a graph illustrating temperature properties of forward voltages Vf1 and Vf2 and a constant voltage Vb of a temperature sensor for inspection provided in the temperature sensor device of the embodiment.

FIG. 2 is a graph illustrating temperature properties of the forward voltages Vf1 and Vf2 and the constant voltage Vb of the temperature sensor 1.

In the embodiment, the relationship between the constant current I1 and the constant current I2 is I1>I2, that is, the relationship between the forward voltage Vf1 and the forward voltage Vf2 is Vf1>Vf2. Since both the forward voltage Vf1 and the forward voltage Vf2 are forward voltages generated in the diode 15, the forward voltage Vf1 and the forward voltage Vf2 have the same temperature properties.

The constant voltage Vb has the same temperature properties as the forward voltages Vf1 and Vf2 generated in a circuit of the constant voltage source 16, which will be described later, but is a slightly lower voltage.

Next, a method for obtaining the temperature from the output voltages of the temperature sensor 1 will be described.

The temperature sensor 1 outputs the forward voltages Vf1 and Vf2 and the constant voltage Vb in the case where the forward currents I1 and I2 flow through the diode 15. The inspection device 200 obtains the temperature from the voltage obtained by amplifying the difference between the output voltages.

A forward voltage Vf in the case of a forward current I being passed through the diode is expressed by the following equation (1).

$$Vf = (kT/q) \times \ln(I/Is) \qquad (1)$$

(k is the Boltzmann constant, T is an absolute temperature, q is an electron charge and Is is a saturation current)

From equation (1), the forward voltages Vf1 and Vf2 of the diodes are represented by the following equations (2) and (3) respectively.

$$Vf1 = (kT/q) \times \ln(I1/Is) \qquad (2)$$

$$Vf2 = (kT/q) \times \ln(I2/Is) \qquad (3)$$

The difference between the forward voltage Vf1 and the constant voltage Vb and the difference between the forward voltage Vf2 and the constant voltage Vb are amplified by the amplifier with the amplification factor A respectively. The output voltages of the amplifier are represented by the following equations (4) and (5), of which are Vo1 and Vo2 respectively.

$$Vo1 = A\{(kT/q) \times \ln(I1/Is) - Vb\} \qquad (4)$$

$$Vo2 = A\{(kT/q) \times \ln(I2/Is) - Vb\} \qquad (5)$$

If the ratio of the forward currents I1 and I2 is N:1, a difference ΔVo between the output voltages of the amplifier is represented by the following equation (6).

$$\Delta\, Vo = Vo1 - Vo2 = A(kT/q) \times \ln(N) \qquad (6)$$

According to the equation (6), it can be seen that the term of the constant voltage Vb can be eliminated in addition to the term of the saturation current Is of a diode by taking the difference between the output voltages of the amplifier. Solving the equation (6) for the absolute temperature T, the absolute temperature T is expressed by the following equation (7).

$$T = q \times \Delta Vo/\{A \times k \times \ln(N)\} \qquad (7)$$

Thus, the temperature may be obtained by measuring the output voltages Vo1 and Vo2 of the amplifier with a voltmeter and using the equation (7).

Further, a temperature coefficient d Δ Vo/dT may be obtained by differentiating both sides of the equation (7).

$$d\Delta Vo/dT = A \times (k/q) \times \ln(N) \qquad (8)$$

If k=1.38×10⁻²³[J/K], q=1.60×10⁻¹⁹[C] and N=2, the temperature coefficient dΔVo/dT is expressed by the following equation from equation (8).

$$d\Delta Vo/dT \approx A \times 60[\mu\ V/K] \qquad (9)$$

Here, if a minute temperature change has to be measured, for example, a temperature change of 0.1K, the temperature coefficient is A×6[μV/0.1K] from the equation (9). At this time, the amplification factor A of the amplifier is set to 100 or more so that the voltage change (temperature coefficient of 600 μV/0.1K) is measurable by a general voltmeter such as an IC tester.

Here, in the case of the forward voltages Vf1 and Vf2 of the diode being about 0.6V at a certain temperature, the constant voltage Vb is set to 0.594V, and the output voltage of the amplifier with the amplification factor A of 100 is about 0.6V because the difference of 0.006V between the forward voltages Vf1 and Vf2 and the constant voltage Vb is amplified.

As described above, the temperature sensor 1 may accurately measure a minute temperature change (temperature coefficient of 600 μV/0.1K) while the voltage amplified by the amplifier of the inspection device 200 is about 0.6V.

Thus, the inspection device 200 used in the inspection process may inspect the temperature sensor circuit 2 based on the temperature obtained from the output voltages of the temperature sensor 1 for inspection. That is, since the inspection device 200 does not need a high performance IC tester which applies a temperature with high resolution, manufacturing costs may be reduced. Furthermore, since the voltage amplified by the amplifier is about 0.6 V, the inspection device 200 does not need a high performance voltmeter, and manufacturing costs may be reduced.

Figure 3:
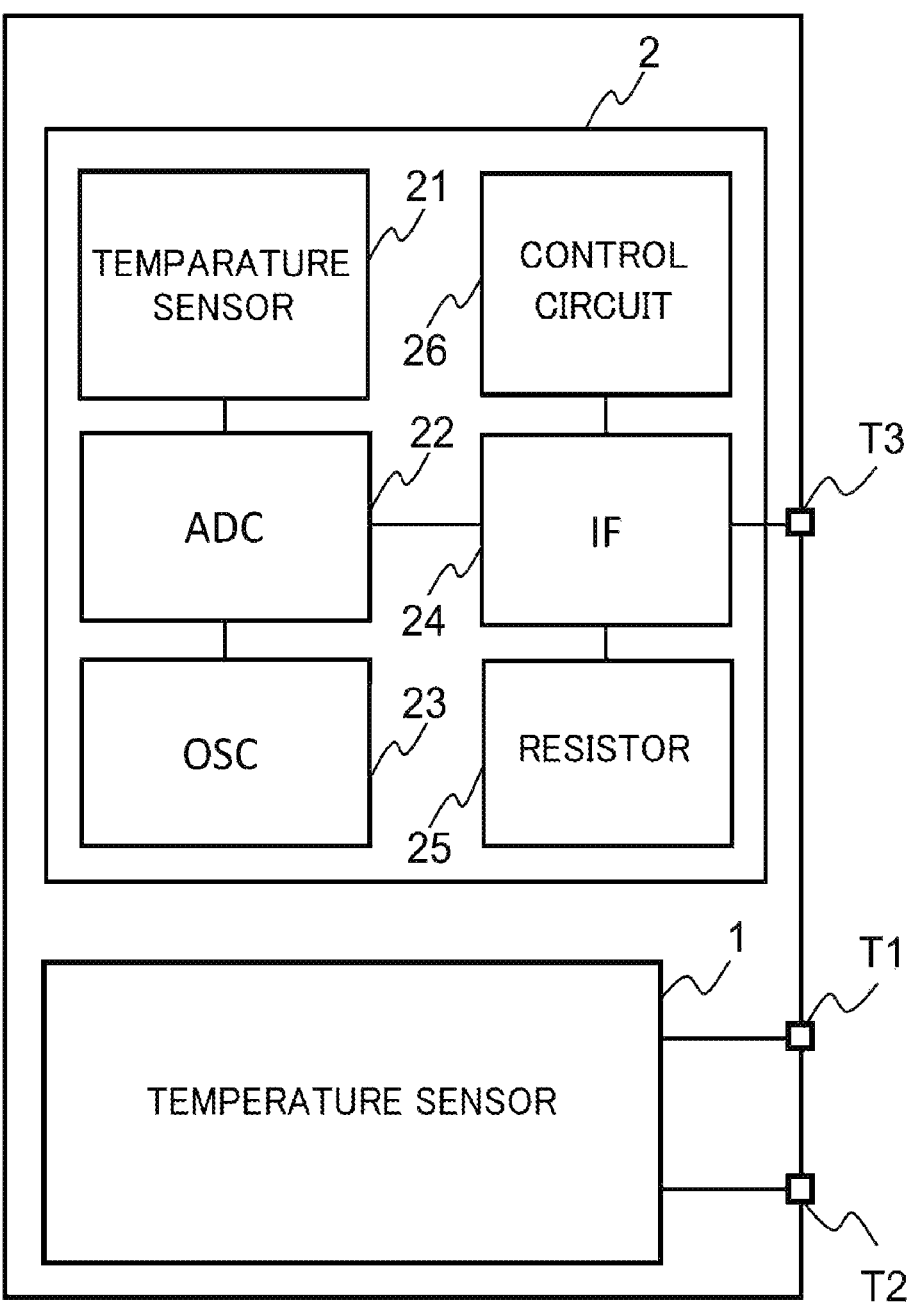
FIG. 3 is a circuit diagram illustrating an example of a temperature sensor circuit of the temperature sensor device of the embodiment.

FIG. 3 is a circuit diagram illustrating an example of the temperature sensor circuit 2 of the temperature sensor device 100.

The temperature sensor circuit 2 includes a temperature sensor 21, an AD converter 22, an oscillation circuit 23, an interface 24, a resistor 25 and a control circuit 26. If the temperature sensor circuit 2 is a digital temperature sensor, the temperature sensor circuit 2 may easily improve the detection accuracy, and since an output signal is a digital signal, inspection is facilitated.

Figure 4:
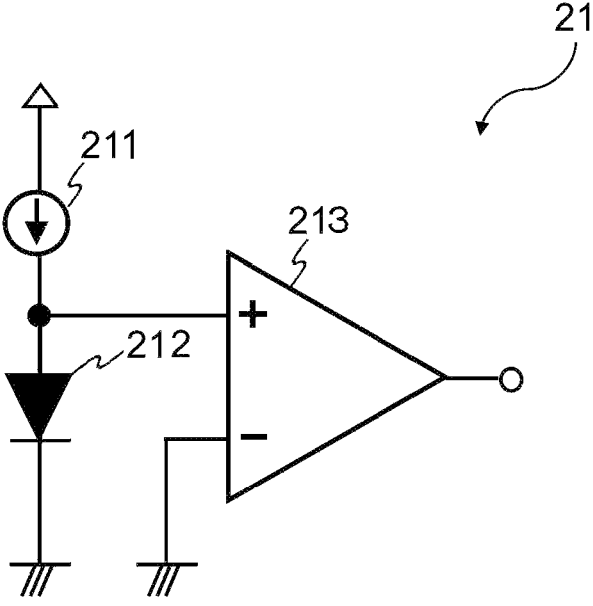
FIG. 4 is a circuit diagram illustrating an example of the temperature sensor of the embodiment.
Figure 5:
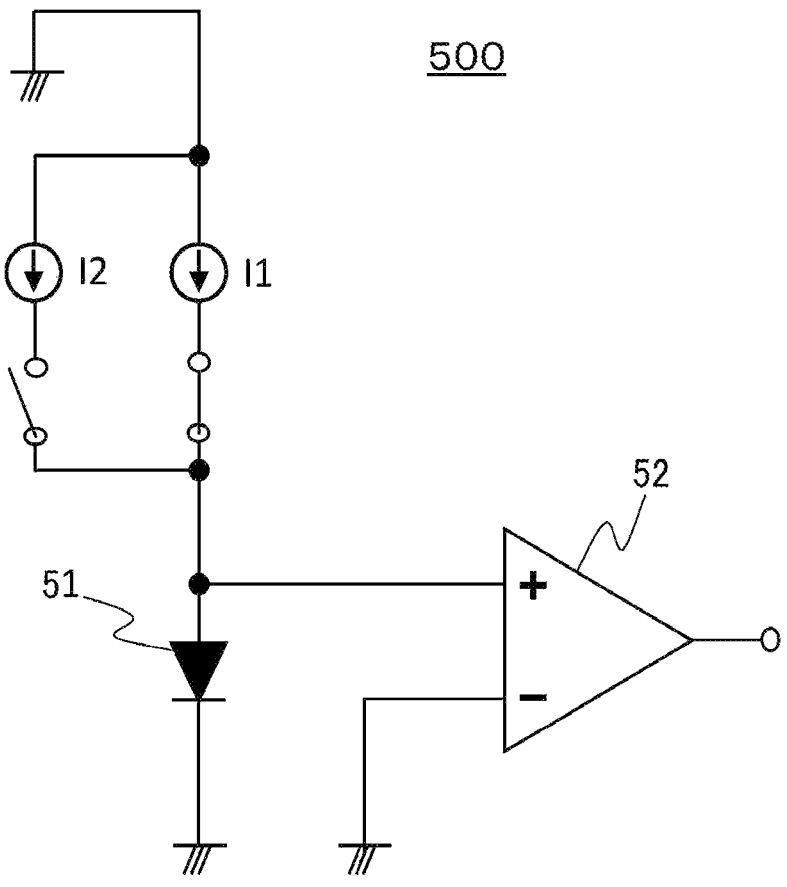
FIG. 5 is a circuit diagram illustrating a conventional temperature sensor.

FIG. 4 is a circuit diagram illustrating an example of the temperature sensor 21. The temperature sensor 21 includes a constant current source 211, a diode 212 which is a temperature sensing element and an amplifier 213.

Since the temperature sensor circuit 2 is a digital temperature sensor, the temperature sensor 21 preferably has a circuit configuration which does not increase the size of a digital conversion unit. Unlike the temperature sensor 1, the temperature sensor 21 illustrated in FIG. 4 does not obtain a temperature from forward voltages of two values, the resistor size of the digital conversion unit may be reduced.

As described above, the temperature sensor device 100 of the embodiment may measure minute temperature changes and may reduce manufacturing costs.

Since the temperature sensor device 100 includes the temperature sensor 1 of high precision for inspection, the inspection device 200 does not need a high performance IC tester which applies a temperature with high resolution, thereby reducing manufacturing costs. Furthermore, since the amplifier of the inspection device 200 amplifies the difference between the forward voltage Vf1 output by the temperature sensor 1 and the constant voltage Vb, and the difference between the forward voltage Vf2 and the constant voltage Vb, the amplification factor may be small. Thus, as the inspection device 200 does not need a high performance voltmeter, manufacturing costs may be reduced.

Although the embodiments of the present invention have been described above, the present invention is not limited to the embodiments described above. In the implementation stage, implement may be performed in various forms other than the above-described embodiments, and various omissions, additions, replacements, or modifications may be made without departing from the spirit of the invention.

For example, in the embodiments, a diode, which is a temperature sensing element, is described, but the present invention is not limited thereto, and any PN junction element may be used. A PN junction element is a semiconductor element including a contact surface (PN junction) between a P-type semiconductor and an N-type semiconductor, and is not limited to a diode. Also, the forward voltage Vf of the diode as the PN junction element has been described as about 0.6V, and the constant voltage Vb having the same temperature properties as the forward voltage Vf of the diode has been described as 0.594V, but not limited thereto. In addition, different currents of two values supplied to the diode by the variable current source have been described, but not limited thereto, and temperature measurement may be performed by using different currents of three or more values.

Such embodiments and modifications thereof are included in the scope and spirit of the invention, and are also included in the scope of the invention described in the claims and equivalents thereof.

What is claimed is:

1. A temperature sensor device, comprising:
a temperature sensor circuit; and
a temperature sensor,
wherein the temperature sensor comprises
a PN junction element, configured to be a temperature sensing element, a variable current source, configured to supply different forward currents of at least two values to the PN junction element, and
a constant voltage source, configured to output a constant voltage having the same temperature properties as a forward voltage of the PN junction element, wherein the temperature properties comprise a rate of change of voltage with temperature.

2. The temperature sensor device according to claim 1, wherein
the temperature sensor outputs different forward voltages of at least two values of the PN junction element and the constant voltage.

3. The temperature sensor device according to claim 2, wherein the constant voltage is set in consideration of the different forward voltages of the at least two values of the PN junction element, an amplification factor of an amplifier of an inspection device and capability of a voltmeter.

4. The temperature sensor device according to claim 1, wherein the constant voltage is set in consideration of different forward voltages of at least two values of the PN junction element, an amplification factor of an amplifier of an inspection device and capability of a voltmeter.

* * * * *